United States Patent [19]
Suzuki et al.

[11] Patent Number: 5,658,691
[45] Date of Patent: Aug. 19, 1997

[54] ELECTRODE FOR BATTERY AND PROCESS FOR PRODUCING ELECTRODE FOR BATTERIES

[75] Inventors: Tatsuhiko Suzuki; Jun Tsukamoto, both of Otsu; Keizo Ono, Iyo; Hideo Saruyama; Katsumi Yamasaki, both of Iyo-gun, all of Japan

[73] Assignee: Toray Industries, Inc., Tokyo, Japan

[21] Appl. No.: 387,929

[22] PCT Filed: Jun. 23, 1994

[86] PCT No.: PCT/JP94/01007

§ 371 Date: Apr. 20, 1995

§ 102(e) Date: Apr. 20, 1995

[87] PCT Pub. No.: WO95/00977

PCT Pub. Date: May 1, 1995

[30] Foreign Application Priority Data

| Jun. 23, 1993 | [JP] | Japan | 5-152408 |
| Jun. 23, 1993 | [JP] | Japan | 5-190352 |
| Jun. 30, 1993 | [JP] | Japan | 5-161637 |
| Jun. 30, 1993 | [JP] | Japan | 5-161639 |
| Jun. 30, 1993 | [JP] | Japan | 5-223476 |

[51] Int. Cl.$^6$ .................................................. H01M 4/38
[52] U.S. Cl. ............................................ 429/218; 429/209
[58] Field of Search ........................................ 429/218, 209

[56] References Cited

U.S. PATENT DOCUMENTS 5,246,794  9/1993  Blomgren et al. ................. 429/218 X

FOREIGN PATENT DOCUMENTS

| 0 168 669 | 1/1986 | European Pat. Off. . |
| 0 328 131 | 8/1989 | European Pat. Off. . |
| 4-067568 | 3/1992 | Japan . |

OTHER PUBLICATIONS

Proceedings of the Symposium on High Power, Ambient Temperature Lithium Batteries, Phoenix, AZ. The Electrochemical Society, 13 Oct. 1991, Pennington, NJ; pp. 80–89, N Imanishi et al., "The Structure and Charge–Discharge Characteristics of Mesophase–Pitch based Carbons".

Supplementary European Search Report Sep. 1995.

*Primary Examiner*—John S. Maples
*Attorney, Agent, or Firm*—Fish & Richardson PC

[57] ABSTRACT

The present invention relates to an electrode for batteries comprising carbon fibers having a crystallite thickness determined by X-ray diffraction method of not less than 1.3 nm and not more than 1.7 nm. The present invention also relates to a process for producing an electrode for batteries employing carbon fibers, comprising baking the carbon fibers at a temperature of not lower than 900° C. and not higher than 1330° C. The present invention enabled to provide a secondary battery which exploits the properties of carbon fibers and which has a high discharging capacity.

16 Claims, No Drawings

ELECTRODE FOR BATTERY AND PROCESS FOR PRODUCING ELECTRODE FOR BATTERIES

SPECIFICATION

1. Technical Field

The present invention relates to an electrode for batteries and to a rechargeable secondary battery using the same.

2. Background Art

With wide spreading of portable devices such as video cameras and note type personal computers, compact and high capacity secondary batteries are more and more demanded. Most of the secondary batteries presently used are nickel-cadmium batteries using alkaline electrolytic solutions. However, these conventional batteries have a low battery voltage of about 1.2 V and it is difficult to promote energy density. To overcome this problem, high energy secondary batteries employing lithium metal having the poorest potential have been studied.

However, with the secondary batteries employing lithium metal as the anode, the lithium grows in the form of branches of a tree (dendrite) as a result of repetition of charging and discharging, the batteries have a danger to fire because of short circuit. Further, since lithium metal having high activity is used, the batteries are intrinsically dangerous and so problematic for personal uses. Recently, lithium ion secondary batteries employing various materials made of carbon which overcome the problem on safety and which exhibit high energy characteristic to lithium batteries were proposed. These batteries exploit the fact that the carbon material is doped with lithium ions and becomes the same potential as lithium metal so that it can be used as an anode in place of lithium metal. The batteries employing the carbon material doped with lithium ion are free from the problem of formation of dendrite and are highly safe because lithium metal is not used at all, so that they are now actively studied.

Secondary batteries employing the electrodes which utilize the doping of lithium ion to carbon material are described in, for example, Japanese Laid-open Patent Application (Kokai) Nos. 62-90863 and 62-122066. The carbon material employed in these known batteries is in the form of powder, so that a polymer binder such as Teflon or vinylidene fluoride is needed to form an electrode. However, if carbon fibers or a structure made of carbon fibers are used as the carbon material in place of the carbon powder, the electrode can be constructed without using the binder and with a small amount of carbon material. Further, in view of the chemical stability to electrolytes, structural stability to volume expansion due to the doping, and characteristics on repetition of charging and discharging, it is said that carbon fibers and structures made of carbon fibers are excellent. Secondary batteries employing such an electrode are known and described in, for example, Japanese Laid-open Patent Applications (Kokai) Nos. 60-54181 and 62-103991.

On the other hand, intercalation (or doping) in carbon materials has been studied for a long time and a number of discoveries have been accumulated. However, it used to be believed that the carbon materials in which intercalation can be attained are restricted to those highly graphitic carbon (i.e., those having high degree of crystallinity). However, it was discovered recently that intercalation can also be attained in carbon materials having low degree of crystallinity, such as baked organic materials, and such carbon materials are now more and more drawing attention.

However, about the mechanism of intercalation in carbon materials, a number of points have not been clarified and a guiding principle to look for a high performance carbon material for secondary batteries has not been established. Thus, the carbon materials are now being developed by repetition of trial and error. The policies for looking for the high performance carbon material include a policy to look for an amorphous carbon material, as well as a crystal carbon material. However, in the prior art, charging and discharging capacities of the carbon materials are insufficient, so that the capacities of the batteries employing such a carbon materials are also small accordingly.

An object of the present invention is to overcome the drawback in the prior art and to provide an electrode for batteries, which has the advantage of employing carbon fibers and has a large capacity of charging and discharging, as well as a secondary battery employing the electrode.

BEST MODE FOR CARRYING OUT THE INVENTION

To attain the above-mentioned object, the present invention has the following constitution. That is, the present invention provides an electrode for batteries, which comprises carbon fibers having a crystallite size Lc determined by X-ray diffraction method of 1.3–1.7 nm; a secondary battery using the electrode; and a process for producing the electrode for batteries.

Here, the crystallite size Lc is calculated from the half width of the peak of the Miller index (002), measured by X-ray diffraction, using the Scherrer's equation which follows:

$$Lc(002) = K\lambda/\beta_o \cos\theta_B \tag{1}$$

wherein $Lc(002)$ represents average crystallite size in the direction perpendicular to (002); $K$ represents 1.0; $\lambda$ represents wavelength of X-ray (in case of CuK$\alpha$, 0.154 nm); $\beta_o = (\beta_E^2 - \beta_I^2)^{1/2}$ wherein $\beta_E$ represents apparent half width (measured value) and $\beta_I$ represents compensated value; $\theta_B$ represents Bragg's angle.

As the carbon fibers employed in the present invention, fibrous baked organic materials obtained by baking a fibrous organic material are preferred, although the carbon fibers are not restricted thereto. In general, the larger the crystal thickness Lc, the higher the so called degree of crystallinity of carbon fibers, and the smaller the Lc, the lower the degree of crystallinity of carbon fibers. If the degree of crystallinity of a carbon material is high, the mobility of ions in the carbon material is low, so that the discharging capacity is reduced, which is problematic. On the other hand, if the degree of crystallinity is too low, since the carbonization is not sufficient, it is difficult to use the carbon material as an electrode. Therefore, in the present invention, carbon fibers having crystallite size determined by X-ray diffraction of not less than 1.3 nm and not more than 1.7 nm are employed.

In general, orientation degree P is an index indicating how much the faces of carbon layers in the carbon fibers are oriented with respect to the direction of the fiber axes and may be measured by the following method:

By arranging a fiber sample on a fiber sample bed such that the carbon fiber axis is vertical and by irradiating X-ray (Cu, K$\alpha$) to the fiber sample from a perpendicular direction, a strong diffraction of (002) emerges in the vicinity of a diffraction angle 2$\theta$ of about 26° in the horizontal plane. While rotating the carbon fiber in the plane perpendicular to the impinging X-ray, the dependency of the diffraction intensity on the rotation angle is measured in the vicinity of a diffraction angle 2$\theta$=26° in the horizontal plane. The half width determined from this angle dependency of the intensity is defined as angle H, and the orientation degree P is calculated from the following equation:

$$P=\{(180-H)/180\}\times 100\ (\%) \quad (2)$$

Carbon fibers generally have orientation. This means that the carbon layers are aligned in an average direction. In cases where a carbon fiber is used as a material of an active electrode, if the orientation degree is too high, the material is highly anisotropic structurally, so that the ease of intercalation varies depending on the direction. As a result, the capacity tends not to be increased. Therefore, it is preferred to employ a carbon fiber having an orientation degree P of not less than 70 and not more than 85.

Specific resistance ρ of a carbon fiber, known as volume resistivity or specific resistivity, is the electric resistivity in the longitudinal direction of the fiber, and can be measured by the following method:

A test piece with an appropriate length is sampled from a bundle of carbon fibers. The test sample is fixed on a copper electrode arranged above an insulated plate with a distance of 500 mm, such that the sample is not bent by applying an appropriate load on one edge of the sample. The resistance $R_b$ (Ω) between the electrodes is measured with a resistance meter. The specific resistance ρ(Ω·cm) is calculated according to the following equation:

$$\rho=(R_b/L)\times\{m/(l\times A)\} \quad (3)$$

wherein m represents mass (g) of the sample; l represents length (cm) of the sample; and A represents density (g/cm$^3$) of the sample.

In general, carbon fibers are known as good conductors. However, their specific resistances largely vary depending on the manufacturing process and the like. In cases where a carbon fiber having a large specific resistance is used as an active electrode, since the decrease of potential due to resistance of the electrode is large, the capacity tends not to be high. On the other hand, if the specific resistance is small, the degree of crystallinity is high and the mobility of ions in the carbon materials is low, so that the capacity tends to be decreased. Therefore, it is preferred to employ a carbon fiber having a specific resistance of not less than 1.0×10$^{-3}$ Ω·cm and not more than 4.0×10$^{-3}$ Ω·cm, more preferably not less than 1.0×10$^{-3}$ Ω·cm and not more than 2.5×10$^{-3}$ Ω·cm.

The carbon fibers employed in the present invention are not restricted and baked organic materials may usually be employed. More particularly, PAN-based carbon fibers obtained from polyacrylonitrile (PAN), pitch-based carbon fibers obtained from pitch from coal or petrol, cellulose-based carbon fibers obtained from celluloses, epitaxial carbon fibers obtained from gases of low molecular organic materials and the like are exemplified. In addition, carbon fibers obtained by baking polyvinyl alcohols, lignins, polyvinyl chlorides, polyamides, polyimides, phenolic resins, furfuryl alcohol or the like may also be suitably employed. Among these carbon fibers, taking the characteristics of the electrode and battery in which the carbon fibers are employed into consideration, carbon fibers which satisfy the characteristics are appropriately selected and used.

When used as an anode of a secondary battery employing a non-aqueous electrolytic solution, among the carbon fibers, PAN-based carbon fibers and pitch-based carbon fibers are preferred. Especially, PAN-based carbon fibers are preferred because the doping of alkaline metal ions, especially lithium ion, is well accomplished.

In cases where PAN-based carbon fibers are employed, those having a weight ratio of nitrogen element to carbon element of not less than 0.07 and not more than 0.22 are preferred. If the nitrogen/carbon weight ratio is less than 0.07, crystallization is easily proceeded, so that the capacity tends to be decreased. On the other hand, if the nitrogen/carbon weight ratio is more than 0.22, the carbonization does not proceed sufficiently, so that it may be difficult to use the carbon material as an electrode. The elemental weight ratio can be measured by elementary analysis by using an apparatus for elementary analysis ordinarily used, such as, for example, CHN Corder MT-3 Type manufactured by YANAGIMOTO SEISAKUSHO.

PAN-based carbon fibers may be produced by a number of known processes described in Japanese Patent Publication (Kokoku) Nos. 37-4405, 44-21175, 47-24185, 51-6244 and the like. In the present invention, desired carbon fibers may be obtained by employing these processes. In cases where carbon fibers having low degree of crystallinity employed in the present invention are produced, it is preferred to employ a baking temperature of not lower than 900° C. and not higher than 1330° C. If the baking temperature is lower than 900° C., although those having low degree of crystallinity can be obtained, the carbonization is insufficient, so that they may not be suitable for constituting the carbon electrode. On the other hand, if the baking temperature is higher than 1330° C., crystallization is proceeded and so the capacity tends to be decreased. To obtain carbon fibers having low degree of crystallinity and low orientation degree, which are employed in the present invention, it is effective to carry out the baking under small or no tension.

Known processes for producing carbon fibers, including wet spinning methods and dry-jet wet spinning methods may be employed, and dry-jet wet spinning methods are especially preferred. The term "dry-jet wet spinning method" herein means a method in which a solution containing a polymer for forming the carbon fibers and a solvent of the polymer is first spun in the air and the resulting yarn is then introduced to a coagulation bath to obtain coagulated raw fibers. It is preferred to stretch the obtained raw fibers. By once spinning the solution in the air and then introducing the resulting yarn into the coagulation bath, the tension exerted to the yarns during the recovery step of the coagulated raw fibers can be made small, especially, the spinning tension exerted to the coagulated raw fibers in the initial stage of coagulation can be made small. As a result, raw fibers having highly dense surfaces may be obtained, so that carbon fibers having excellent characteristics as an electrode for batteries may be produced.

In the above-described method in which a solution containing a polymer for forming the carbon fibers and a solvent of the polymer is first spun in the air and the resulting yarn is then introduced to a coagulation bath, it is also preferred to adjust the concentration of the coagulation bath within a range of concentration at which a skin layer cannot be formed. With the raw fibers coagulated in the coagulation bath having a concentration within a range in which a skin layer cannot be formed, the effective stretching ratio is reduced, so that the orientation degree of the raw fibers can be made smaller than that of the raw fibers obtained in an ordinary coagulation bath. Therefore, the obtained raw fibers are suitable for obtaining the carbon fibers having a low crystallinity and a low orientation degree, which are suited for the present invention.

Although the above-mentioned range in which the skin layer cannot be formed varies depending on the composition of the polyacrylonitrile, that is, on the molecular weight, copolymerization ratio and the like, the range may be set by the method described in, for example, Japanese Laid-open Patent Application (Kokai) No. 61-1197707. In cases where water, for example, is the coagulating agent, the concentration range in which the skin layer cannot be formed is 60–90% by weight for organic solvents such as dimethylformamide, dimethylacetamide, dimethylsulfoxide and the like, 40–50% by weight for nitric acid which is an inorganic solvent, and 20–40% by weight for zinc chloride and thiocyanates.

The carbon fibers obtained by baking may be used as they are. Alternatively, the carbon fibers may preferably be subjected to a surface treatment so as to remove a part of the surface layer. Methods for removing a part of the surface layer include liquid phase oxidization treatments and gas phase oxidization treatments. More particularly, examples of the methods for removing a part of the surface layer include a method in which the carbon fibers are oxidized electrochemically by using the carbon fibers as an anode in an aqueous electrolytic solution containing nitrate ion; and a method in which the carbon fibers are oxidized electrochemically by using the carbon fibers as an anode in an aqueous electrolytic solution containing an alkaline compound as an indispensable component.

Although the electrode made of the carbon fibers may be in any form, it is preferred to arrange the fibers along one direction, or to make the fibers into a structure in the form of cloth or felt. Examples of the structures in the form of cloth or felt include woven fabric, knit, braid, lace, net, felt, paper, non-woven fabric, mat and the like. Among these, in view of the properties of the carbon fibers and of electrode characteristics, woven fabric and felt are preferred. In cases where the carbon fibers are arranged along one direction, a method, for example, in which the carbon fibers are aligned on a metal current collector such as copper foil, and a solution containing a resin acting as an adhesive is applied to the fibers so as to adhere the fibers to the current collector may be employed. Further, as for the direction of arrangement, in case of cylindrical batteries, it is preferred to arrange the carbon fibers along the direction of winding of the current collector or along the direction perpendicular to direction of winding of the current collector. In particular, it is preferred to arrange the fibers in the direction perpendicular to direction of winding of the current collector because peeling or the like may be avoided.

Although the diameter of the carbon fibers employed in the present invention should be selected so that the formation of the electrode is easy, the diameter of the carbon fibers may preferably be 1–1000 µm, more preferably 1–20 µm. It is also preferred to employ several kinds of carbon fibers having different diameters.

The electrode according to the present invention comprising the carbon fibers may be used as an active electrode of various batteries. The type of the battery is not restricted and the electrode may be employed in any type of batteries including primary batteries and secondary batteries. Among these, the electrode may preferably be employed as an anode of secondary batteries. Among the secondary batteries, secondary batteries employing non-aqueous electrolytic solution containing an alkaline metal salt such as lithium perchlorate, lithium borofluoride, lithium hexafluorophosphide or the like are especially preferred.

In cases where the electrode according to the present invention is used in a secondary battery employing a non-aqueous electrolytic solution containing an alkaline metal salt, the carbon fibers are doped with a cation or an anion. The carbon fibers doped with a cation is used as an anode and the carbon fibers doped with an anion is used as a cathode. The electrode according to the present invention may be used as a cathode or anode depending on various characteristics. However, it is not necessary to employ the electrode according to the present invention as both anode and cathode, and it is also a preferred embodiment to constitute the anode with the electrode according to the present invention comprising carbon fibers and to constitute the cathode with an electrode which does not comprise carbon fibers.

In cases where an electrode which does not contain carbon fibers is employed as a cathode, the cathode may be made of an inorganic material such as artificial or natural graphite powder, fluorocarbon, metal or an metal oxide, or an organic polymer compound, in addition to a carbon material in a form other than fibers. When the cathode is made of an inorganic compound such as metal or metal oxide, charging and discharging reactions are caused by doping and undoping of the cation. When the cathode is made of an organic polymer compound, charging and discharging reactions are caused by doping and undoping of the anion. Thus, various charging and discharging reaction modes may be attained depending on the substance, and the reaction modes may be appropriately selected depending on the cathode characteristics of the battery required.

Examples of the substances constituting the cathode which does not contain carbon fibers include those used as cathodes of ordinary secondary batteries, that is, inorganic compounds such as transitional metal oxides and transitional metal chalcogens containing an alkaline metal; conjugated polymers such as polyacetylenes, poly p-phenylenes, polyphenylenevinylenes, polyanilines, polypyrrols and polythiophenes; cross-linked polymers having disulfide bond; thionyl chloride and the like. Among these, in case of a secondary battery employing a non-aqueous electrolytic solution containing a lithium salt, oxides and chalcogens of transition metals such as cobalt, nickel, manganese, molybdenum, vanadium, chromium, iron, copper and titanium are preferably employed. Among these, $LiCoO_2$ and $LiNiO_2$ are best preferred since voltage and energy density are high.

The electrolytic solution of the secondary battery employing the electrode according to the present invention is not restricted and conventional electrolytic solutions such as aqueous acid solutions, aqueous alkaline solutions and non-aqueous solvents may be employed. Among these, as the above-mentioned electrolytic solution of the secondary battery, which is a non-aqueous electrolytic solution containing an alkaline metal salt, propylene carbonate, ethylene carbonate, γ-butyrolactone, N-methylpyrrolidone, acetonitrile, N,N-dimethylformamide, dimethylsulfoxide, tetrahydrofuran, 1,3-dioxolan, methyl formate, sulfolane, oxazolidone, thionyl chloride, 1,2-dimethoxyethane and diethylene carbonate as well as derivatives and mixture thereof are preferably employed. Preferred examples of the electrolyte contained in the electrolytic solution include halides, perchlorates, thiocyanates, borofluorides, phosphofluorides, arsenofluorides, aluminofluorides, trifluoromethylsulfates and the like of alkaline metals, especially lithium.

In the present invention, the discharging capacity of the electrode is measured by the following method. That is, a trielectrode cell was prepared by using carbon fibers as a work electrode, lithium metal as a counter electrode and a reference electrode, and by using a non-aqueous electrolytic solution containing a lithium salt as an electrolyte. The carbon fibers were used as an electrode, for example, after clamping the end of the carbon fibers with a stainless steel mesh, and lithium metal foil was used as the lithium metal.

By carrying out charging and discharging the carbon fibers, the discharging capacity of the electrode is measured. In general, methods for charging and discharging include potentiostatic method and constant current method. Here, constant current method was employed. That is, charging was carried out at a constant current until the potential of the work electrode reached 0 V (vs. Li$^+$/Li), and then discharging was performed until the potential of the work electrode reached 1.5 V (vs. Li$^+$/Li) at a constant current. The current during the charging and discharging was 40 mA per one gram of the carbon fibers. The discharging capacity (mAh/g) was determined from the amount of the discharged charge and the weight of the carbon fibers.

The secondary battery employing the electrode according to the present invention may be widely used in portable electronic machines such as video cameras, personal computers, word processors, radio cassettes, portable telephones and the like, exploiting the light weight, large capacity and high energy density.

EXAMPLES

The present invention will now be described in more concretely by way of examples. It should be noted that the present invention is not restricted to these examples.

Example 1

Polyacrylonitrile fibers having an orientation degree of (400) of 92% were treated at 200°–250° C. in the air under no tension to make the fibers resistant to flame, and the resulting fibers were baked in nitrogen atmosphere under no tension at 1100° C. for 10 minutes to obtain carbon fibers. The orientation degree of the carbon fibers was measured by wide angle X-ray diffraction method (counter method). The orientation degree of the carbon fibers calculated according to the equation (2) was 77.5%. The crystallite size Lc calculated according to the equation (1) was 1.40 nm.

The end of carbon fibers were clamped with a pair of stainless steel mesh serving as a current collector to prepare an electrode, and charging characteristics were evaluated by using a trielectrode cell employing propylene carbonate containing 1M lithium perchlorate as an electrolytic solution, and lithium metal foil as the counter electrode and as the reference electrode. The cell was charged to 0 V (vs. Li$^+$/Li) at a constant current having an electric current density of 40 mA per one gram of the carbon fibers. The discharging capacity of the carbon fiber electrode determined from the amount of the electric charge discharged after the above-mentioned charging was 410 mAh/g.

Example 2

After treating the polyacrylonitrile fibers by the same method as in Example 1 so as to make the fibers resistant to flame, the fibers were baked at about 1200° C. for 10 minutes in nitrogen atmosphere under no tension.

The orientation degree was measured by wide angle X-ray diffraction method (counter method). The orientation degree of the carbon fibers calculated according to the equation (2) was 77.8%. The crystallite size Lc calculated according to the equation (1) was 1.50 nm.

The discharging capacity of the carbon fibers was measured by the same method as in Example 1. The discharging capacity was 390 mAh/g.

Example 3

After treating the polyacrylonitrile fibers by the same method as in Example 1 so as to make the fibers resistant to flame, the fibers were baked at about 1200° C. for 5 minutes in nitrogen atmosphere under tension.

The orientation degree was measured by wide angle X-ray diffraction method (counter method). The orientation degree of the carbon fibers calculated according to the equation (2) was 81.3%. The crystallite size Lc calculated according to the equation (1) was 1.58 nm.

The discharging capacity of the carbon fibers was measured by the same method as in Example 1. The discharging capacity was 380 mAh/g.

Comparative Example 1

After treating the polyacrylonitrile fibers by the same method as in Example 1 so as to make the fibers resistant to flame, the fibers were baked at about 1700° C. for 5 minutes in nitrogen atmosphere under tension.

The orientation degree was measured by wide angle X-ray diffraction method (counter method). The orientation degree of the carbon fibers calculated according to the equation (2) was 82.0%. The crystallite size Lc calculated according to the equation (1) was 2.10 nm.

The discharging capacity of the carbon fibers was measured by the same method as in Example 1. The discharging capacity was 240 mAh/g.

Example 4

Commercially available lithium carbonate ($Li_2CO_3$) and basic cobalt carbonate ($2CoCO_3 \cdot 3Co(OH)_2$) were weighed to attain a molar ratio Li/Co of 1/1, and the compounds were mixed in a ball mill. The mixture was heated at 900° C. for 20 hours to obtain $LiCoO_2$. The obtained product was pulverized in a ball mill, and the resultant was mixed with artificial graphite as an electric conductor, polyfluorovinylidene (PVdF) as a binder and N-methylpyrrolidone as a solvent at a weight ratio $LiCo_2$/artificial graphite/PVdF of 80/15/5 to obtain a slurry for forming a cathode. The obtained slurry was applied on a aluminum foil, dried and pressed to obtain a cathode.

The thus prepared cathode was stacked on the carbon fiber electrode prepared in Example 1 via a porous polypropylene film (Cellguard #2500, commercially available from DAISEL CHEMICAL INDUSTRIES, LTD.) to prepare a secondary battery. As the electrolytic solution, propylene carbonate containing 1M lithium perchlorate was used.

The charging characteristics of the thus prepared secondary battery was evaluated. The battery was charged to 4.3 V at a constant current having an electric current density of 40 mA per one gram of the carbon fibers. The discharging capacity of the secondary battery determined from the amount of the electric charge discharged after the above-mentioned charging was 380 mAh per one gram of the carbon fibers used in this battery.

Comparative Example 2

Using the carbon fiber electrode prepared in Comparative Example 1 as an anode, a secondary battery was prepared by the same method as in Example 4. The discharging capacity was 200 mAh per one gram of the carbon fibers used in the battery.

Example 5

Polyacrylonitrile fibers were treated at 200°–250° C. in the air to make the fibers resistant to flame, and the resulting fibers were baked in nitrogen atmosphere at 1100° C. for 20 minutes to obtain carbon fibers. The specific resistance of the carbon fibers determined according to the equation (3) was $3.0 \times 10^{-3}$ Ω·cm.

The discharging capacity of the carbon fibers was measured by the same method as in Example 1. The discharging capacity was 400 mAh/g. The discharging capacity of the carbon fiber electrode measured by discharging at a constant current with an electric current density of 1 A/g was 340 mAh/g.

Example 6

After treating the polyacrylonitrile fibers by the same method as in Example 1 so as to make the fibers resistant to flame, the fibers were baked at about 1200° C. for 10 minutes in nitrogen atmosphere. The specific resistance of the carbon fibers determined according to the equation (3) was $2.0 \times 10^{-3}$ Ω·cm.

The discharging capacity of the carbon fibers was measured by the same method as in Example 1. The discharging capacity was 380 mAh/g. The discharging capacity of the carbon fiber electrode measured by discharging at a constant current with an electric current density of 1 A/g was 330 mAh/g.

Example 7

After treating the polyacrylonitrile fibers by the same method as in Example 1 so as to make the fibers resistant to flame, the fibers were baked at about 1200° C. for 20 minutes in nitrogen atmosphere. The specific resistance of the carbon fibers determined according to the equation (3) was $1.8 \times 10^{-3}$ Ω·cm. The crystallite size Lc of the carbon fibers calculated according to the equation (1) was 1.6 nm.

The discharging capacity of the carbon fibers was measured by the same method as in Example 1. The discharging capacity was 380 mAh/g. The discharging capacity of the carbon fiber electrode measured by discharging at a constant current with an electric current density of 1 A/g was 330 mAh/g.

Comparative Example 3

After treating the polyacrylonitrile fibers by the same method as in Example 1 so as to make the fibers resistant to flame, the fibers were baked at about 1700° C. for 10 minutes in nitrogen atmosphere. The specific resistance of the carbon fibers determined according to the equation (3) was $1.4 \times 10^{-3}$ Ω·cm. The crystallite thickness Lc of the carbon fibers calculated according to the equation (1) was 2.1 nm.

The discharging capacity of the carbon fibers was measured by the same method as in Example 1. The discharging capacity was 280 mAh/g. The discharging capacity of the carbon fiber electrode measured by discharging at a constant current with an electric current density of 1 A/g was 200 mAh/g.

Comparative Example 4

Commercially available pitch coke was pulverized to obtain carbon powder having an average particle size of about 10 μm. The specific resistance of this powder was $3.0 \times 10^{-3}$ Ω·cm and the crystallite thickness Lc was 2.7 nm.

To the pitch coke powder, 10 parts by weight of polyfluorovinylidene (PVDF) was added and a slurry was prepared by adding N-methyl-2-pyrrolidone (NMP) as a solvent. The slurry was applied on an aluminum foil and dried to prepare an electrode and charging characteristics were evaluated by using a trielectrode cell employing propylene carbonate containing 1M lithium perchlorate as an electrolytic solution, and lithium metal foil as the opposite electrode and as the reference electrode. The cell was charged to 0 V (vs. $Li^+$/Li) at a constant current having an electric current density of 40 mA per one gram of the carbon fibers, and then discharged to 1.5 V (vs. $Li^+$/Li). The discharging capacity of the carbon electrode when the battery was discharged at a constant current with an electric current density of 40 mA per one gram of carbon was 260 mAh/g. The discharging capacity of the carbon electrode when the battery was discharged at a constant current with an electric current density of 1 A per one gram of carbon was 100 mAh/g.

Example 8

Commercially available lithium carbonate ($Li_2CO_3$) and basic cobalt carbonate ($2CoCO_3 \cdot 3Co(OH)_2$) were weighed to attain a molar ratio Li/Co of 1/1, and the compounds were mixed in a ball mill. The mixture was heated at 900° C. for 20 hours to obtain $LiCoO_2$. The obtained product was pulverized in a ball mill, and the resultant was mixed with artificial graphite as an electric conductor, polyfluorovinylidene (PVdF) as a binder and N-methylpyrrolidone as a solvent at a weight ratio $LiCo_2$/artificial graphite/PVdF of 80/15/5 to obtain a slurry for forming a cathode. The obtained slurry was applied on a aluminum foil, dried and pressed to obtain a cathode.

The thus prepared cathode was stacked on the carbon fiber electrode prepared in Example 7 via a porous polypropylene film (Cellguard #2500, commercially available from DAISEL CHEMICAL INDUSTRIES, LTD.) to prepare a secondary battery. As the electrolytic solution, propylene carbonate containing 1M lithium perchlorate was used.

The charging characteristics of the thus prepared secondary battery was evaluated. The battery was charged to 4.3 v at a constant current having an electric current density of 40 mA per one gram of the carbon fibers. The discharging capacity of the secondary battery determined from the amount of the electric charge discharged after the abovementioned charging was 380 mAh per one gram of the carbon fibers used in this battery.

Comparative Example 5

Using the carbon fiber electrode prepared in Comparative Example 3 as an anode, a secondary battery was prepared by the same method as in Example 8. The discharging capacity was 200 mAh per one gram of the carbon fibers used in the battery.

Example 9

Polyacrylonitrile fibers having an orientation degree of (400) of 92% were treated at 200°–250° C. in the air under no tension to make the fibers resistant to flame, and the resulting fibers were baked in nitrogen atmosphere under no tension at 1100° C. for 5 minutes to obtain carbon fibers. The crystallite thickness Lc calculated according to the equation (1) was 1.35 nm. The ratio of the nitrogen content to the carbon content measured by CHN Corder MT-3 Type commercially available from YANAGIMOTO SEISAKUSHO was 0.149.

The discharging capacity of the carbon fibers was measured by the same method as in Example 1. The discharging capacity was 420 mAh/g.

Comparative Example 6

Carbon fibers were prepared in the same manner as in Example 9 except that the baking temperature was 1500° C. The crystallite thickness Lc calculated according to the equation (1) was 1.8 nm. The ratio of the nitrogen content to the carbon content measured by the same method as in Example 9 was 0.031.

The discharging capacity of the carbon fibers was measured by the same method as in Example 1. The discharging capacity was 250 mAh/g.

Example 10

Using the carbon fibers prepared in Example 1, discharging capacity was measured by the same method as in Example 1 except that 1:1 mixture of propylene carbonate containing 1M $LiBF_4$ and 1,2-dimethoxyethane was used as the electrolytic solution. The measured discharging capacity was 400 mAh/g.

Industrial Availability

By the present invention, an electrode for batteries, employing fibrous organic baked material as an active electrode, a secondary battery with large capacity using the electrode, an electrode employed in the battery and a process for producing the electrode are provided.

We claim:

1. An electrode for batteries, comprising carbon fibers having a crystallite size determined by x-ray diffraction of not less than 1.3 nm and not more than 1.7 nm, wherein said carbon fibers have an orientation degree of not less than 70% and not more than 85%.

2. The electrode for batteries according to claim 1, wherein said crystallite size determined by X-ray diffraction method is not less than 1.4 nm and not more than 1.6 nm.

3. The electrode for batteries according to claim 1, which has a discharging capacity of not less than 350 mAh/g.

4. The electrode for batteries according to claim 1, which has a specific resistance of not less than $1.0 \times 10^{-3}$ Ω·cm and not more than $4.0 \times 10^{-3}$ Ω·cm.

5. The electrode for batteries according to claim 1, which has a specific resistance of not less than $1.0 \times 10^{-3}$ Ω·cm and not more than $2.5 \times 10^{-3}$ Ω·cm.

6. The electrode for batteries according to claim 1, wherein said carbon fibers are baked fibrous organic material.

7. The electrode for battery according to claim 6, wherein said carbon fibers are polyacrylonitrile-based carbon fibers.

8. The electrode for batteries according to claim 1, which has a weight ratio of nitrogen element content to carbon element content of not less than 0.07 and not more than 0.22.

9. The electrode for batteries according to claim 1, wherein said electrode is used as an anode.

10. The electrode for batteries according to claim 1, wherein said carbon fibers are aligned in one direction.

11. A process for producing an electrode for batteries employing carbon fibers according to claim 1, comprising baking carbon fibers at a temperature of not lower than 900° C. and not higher than 1330° C.

12. The process for producing an electrode for batteries according to claim 11, wherein said baking is carried out at a temperature of not lower than 1000° C. and not higher than 1300° C.

13. The process for producing an electrode for batteries according to claim 11, wherein said carbon fibers are baked fibrous organic material.

14. The process for producing an electrode for batteries according to claim 11, wherein said carbon fibers are polyacrylonitrile-based carbon fibers.

15. The process for producing an electrode for batteries according to claim 11, wherein raw fibers of said carbon fibers are obtained by stretching coagulated raw fibers prepared by dry-jet wet spinning.

16. The process for producing an electrode for batteries according to claim 15, wherein the dry-jet wet spinning includes treatment in a coagulation bath having a concentration such that a skin layer is not formed on the raw fibers.

* * * * *